(12) United States Patent
Chen et al.

(10) Patent No.: US 6,972,893 B2
(45) Date of Patent: Dec. 6, 2005

(54) PROCESS FOR IMAGEWISE OPENING AND FILLING COLOR DISPLAY COMPONENTS AND COLOR DISPLAYS MANUFACTURED THEREOF

(75) Inventors: Xianhai Chen, Santa Clara, CA (US); HongMei Zang, Sunnyvale, CA (US); Zarng-Arh George Wu, San Jose, CA (US); Rong-Chang Liang, Sunnyvale, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 17 days.

(21) Appl. No.: 10/284,586

(22) Filed: Oct. 30, 2002

(65) Prior Publication Data

US 2003/0063370 A1 Apr. 3, 2003

Related U.S. Application Data

(63) Continuation of application No. 09/879,408, filed on Jun. 11, 2001, now Pat. No. 6,545,797.

(51) Int. Cl.[7] .......................... G02B 26/00; G03G 17/04
(52) U.S. Cl. ...................... 359/296; 345/107; 345/105; 430/32
(58) Field of Search ............................ 359/296; 345/107, 345/105; 430/32, 34, 38; 204/450, 600

(56) References Cited

U.S. PATENT DOCUMENTS

| | | | |
|---|---|---|---|
| 4,298,448 A | 11/1981 | Müller et al. | |
| 4,680,103 A | 7/1987 | Beilin Solomon I. et al. | |
| 4,732,830 A | 3/1988 | DiSanto et al. | |
| 5,930,026 A | 7/1999 | Jacobson et al. | |
| 5,961,804 A | 10/1999 | Jacobson et al. | |
| 6,067,185 A | * 5/2000 | Albert et al. | 359/296 |
| 6,319,381 B1 | * 11/2001 | Nemelka | 204/485 |
| 6,545,797 B2 | * 4/2003 | Chen et al. | 359/296 |

FOREIGN PATENT DOCUMENTS

| GB | 1313412 | 4/1973 |
|---|---|---|
| WO | WO 01/67170 A1 | 9/2001 |

OTHER PUBLICATIONS

*Chan-Park, M., et al., "Process for Roll–to–Roll Manufacture of a Display by Synchronized Photolithographic Exposure on a Substrate Web," Ser. No. 09/784,972—filed Feb. 15, 2001.

*Hopper, M.A., et al., "An Electrophoretic Display, its Properties, Model, and Addressing", *IEEE Trans. Electr. Dev.*—26(8):1148–1152 (1979).

* cited by examiner

*Primary Examiner*—Hung X. Dang
*Assistant Examiner*—Tuyen Tra
(74) *Attorney, Agent, or Firm*—Albert P. Halluin; Viola T. Kung; Howrey, Simon, Arnold & White, LLP

(57) ABSTRACT

This invention relates to the field of electrophoretic displays. In particular, it relates to imagewise opening, filling, and sealing multicolor display components and the manufacture of multicolor displays.

48 Claims, 2 Drawing Sheets

PROCESS FOR IMAGEWISE OPENING AND FILLING COLOR DISPLAY COMPONENTS AND COLOR DISPLAYS MANUFACTURED THEREOF

CROSS-REFERENCE TO RELATED APPLICATIONS

This application is a continuation of U.S. application Ser. No. 09/879,408, filed Jun. 11, 2001 now U.S. Pat. No. 6,545,797, the content of which is incorporated herein by reference in its entirety.

FIELD OF INVENTION

This invention relates to the field of electrophoretic displays. In particular, it relates to imagewise opening and filling multicolor display components and the manufacture of multicolor displays.

BACKGROUND OF THE INVENTION

Electrophoretic displays (EPDs) are known non-emissive displays suitable for use in the display of digital, alphanumeric, analog or graphical information. An EPD system typically comprises a suspension of pigment particles in a dielectric liquid held between two electrodes, at least one of which is transparent. Applied potential across the electrodes causes the charged particles to migrate to one or the other electrode. Where the suspension includes pigment particles and a dielectric liquid of contrasting colors, the movement of the pigment particles will cause images to be displayed, which are visible through the transparent electrode(s) or a viewing sheet.

EPDs have attributes of excellent brightness and contrast, wide view angles, bistability, and low power consumption when compared with liquid crystal displays. The basic technology associated with the development and manufacture of EPD's has been disclosed in U.S. Pat. Nos. 5,961,804, 4,732,830, 4,680,103, 4,298,448, 4,732,830 and cited patents therein; and the disclosures of these patents are incorporated herein by reference in their entirety.

Among the advantages of an EPD over other types of flat panel displays is the very low power consumption. This salient advantage makes the EPD particularly suitable for portable and battery powered devices such as laptops, cell phones, personal digital assistants, portable electronic medical and diagnostic devices, global positioning system devices and the like.

In order to prevent undesired movements of particles such as sedimentation in the dielectric fluid, partitions were proposed between the two electrodes for dividing the space into smaller cells. See for example, M. A Hopper and V. Novotny, IEEE Trans. Electr. Dev., Vol ED 26, No. 8, pp. 1148–1152 (1979). However, the filling and sealing processes of electrophoretic fluids in these cells are of very low throughput and high cost.

Attempts have been made to enclose the suspension in microcapsules. U.S. Pat. Nos. 5,961,804 and 5,930,026 describe microencapsulated EPDs. These displays have a substantially two dimensional arrangement of microcapsules each having therein an electrophoretic composition of charged pigment particles suspended in a dielectric fluid that visually contrasts with the particles.

U.S. patent application Ser. Nos. 09/518,488 and 09/784,972 (the "'488 and '972 Applications"), assigned to the same inventive entity, describe EPDs comprising microcups of well-defined shape, size and aspect ratio, filled with charged pigment particles dispersed in an optically contrasting dielectric solvent. The methods of manufacturing the microcups or cells of well-defined shape, size and aspect ratio have also been described in the '488 and '972 Applications and are incorporated by reference herein in their entirety.

The methods of preparing the improved color EPD disclosed in the '488 and '972 Applications include laminating preformed empty microcups with a layer of positively working photoresist, imagewise exposure of the positive photoresist to selectively open a certain number of photoresists, filling the selectively opened microcups with a colored electrophoretic fluid, and sealing the filled microcups. The sequence of opening and developing the photoresist, and filling and sealing of the microcups may be performed in iterative steps to create sealed microcups filled with electrophoretic fluids of different colors.

One aspect of the above cited '972 Application relates to a novel roll-to-roll process and apparatus which permit the manufacture of the display to be carried out continuously by a synchronized photo-lithographic process. The synchronized roll-to-roll process and apparatus are also useful for manufacturing liquid crystal displays (LCD) and other structures and assemblies for electronic devices.

The '972 Application also describes the manufacture of a plurality of microcups which are formed integrally with one another as portions of a structured two-dimensional array assembly, being formed upon a support web including a patterned conductor film, such as addressable indium-tin oxide (ITO) lines. Each microcup of the array assembly is filled with a suspension or dispersion of charged pigment particles in a dielectric solvent, and sealed to form an electrophoretic cell.

The substrate web upon which the microcups are formed includes a display addressing array comprising pre-formed conductor film, such as ITO conductor lines. The conductor film (ITO lines) and support web are coated with a radiation curable layer. The film and radiation curable layer are then exposed imagewise to radiation to form the microcup wall structure. Following exposure, the unexposed area is removed by using a developer, leaving the cured microcup walls bonded to the conductor film/support web. The imagewise exposure may be by UV or other forms of radiation through a photomask to produce an image or predetermined pattern of exposure of the radiation curable material coated on the conductor film. Although it is generally not required for most applications, the mask may be positioned and aligned with respect to the conductor film, i.e., ITO lines, so that the transparent mask portions align with the spaces between ITO lines, and the opaque mask portions align with the ITO material. The '488 and '972 Applications also describe a microcup array prepared by a process including embossing a thermoplastic or thermoset precursor layer coated on a conductor film with a pre-patterned male mold, followed by releasing the mold. The precursor layer may be hardened by radiation, cooling, solvent evaporation, or other means. Solvent-resistant, thermomechanically stable microcups having a wide range of size, shape, pattern, and opening ratio can be prepared by either one of the aforesaid methods.

In addition, the above cited '488 and '972 Applications describe the manufacture of a monochrome EPD from a microcup assembly by filling the microcups with a single pigment suspension composition, sealing the microcups, and finally laminating the sealed array of microcups with a second conductor film pre-coated with an adhesive layer.

The '488 and '972 Applications also relate to the manufacture of a color EPD from a microcup assembly by a process of sequential selective opening and filling of predetermined microcup subsets. The process includes laminating or coating the pre-formed microcups with a layer of positively working photoresist, selectively opening a certain number of the microcups by imagewise exposing the positive photoresist, followed by developing the resist, filling the opened cups with a colored electrophoretic fluid, and sealing the filled microcups by a sealing process. These steps may be repeated to create sealed microcups filled with electrophoretic fluids of different colors to form a color EPD.

The '972 Application also describes a synchronized roll-to-roll photolithographic exposure method and apparatus, which may be employed for a number of useful processes, including the process of making the microcup array and the process of selectively filling of the array of microcups to form a color display assembly. The imagewise roll-to-roll photolithographic exposure is performed through a moving photomask synchronized, or in semi-continuous synchronized, manner with a moving web substrate, to permit imagewise exposure of the workpiece (e.g., microcup array or color display) in a continuous or semi-continuous and seamless manner. This synchronized roll-to-roll exposure photolithographic process is also amenable for the manufacture of color displays.

The synchronized roll-to-roll process may be adapted to the preparation of a wide range of structures or discrete patterns for electronic devices formable upon a support web substrate, e.g., patterned ITO films, flexible circuit boards and the like.

However, where the manufacture of high contrast ratio color displays requires the use of microcups that are structurally wide and deep, resulting in relatively thin partitions between the microcups, defects in the finished displays are often observed.

These defects may be attributed to, in part, defects in various individual manufacturing steps, including poor mechanical and dissolution characteristics of the positive photoresist, error in the undercutting of the resist by the developers, and poor adhesion of the photoresist to the walls or partitions of the microcups. These manufacturing defects appear as indefinite microcup structures and adversely affect the quality of the display images. Therefore, there exists a need for a novel, defect free manufacturing process for imagewise opening the microcups and filling them with selectively colored electrophoretic fluid for the making of color EPDs.

SUMMARY OF THE INVENTION

In the broadest application of this invention, the innovative approach for the manufacture of multicolor displays involves the sequence of filling the microcups array with a removable temporary filler material which can be removed or washed away later by the developer used for the positively working photoresist, coating onto the filled microcups a t positively working photoresist, imagewise exposing and developing the resist, removing the filler material during or after the resist development process, filling the emptied microcups with colored display fluids, and finally sealing the filled cups by the sealing process disclosed in the co-pending '488 and '972 Applications assigned to the same entity. The same iterative process is then performed with different colored display fluids for the making of multicolor displays.

The steps of adding and removing the temporary fillers serve to maintain structural integrity of the photoresist layer coated on the microcups in the non-imaging area, particularly for the resists coated on cups having large and deep openings such as 50 to 200 microns in diameter and a depth in the range of 3 to 100 microns, preferably about 5 to 50 microns. The steps also eliminate the need of a tenting adhesive layer between the photoresist and the microcup array. The manufacturing process of this invention provides a much wider process and material latitude in the manufacture of high definition multicolor displays.

Various color display media or suspensions of different colors, compositions, liquid crystals, or any other suitable display fluids for generating multicolor displays known in the art may be used.

The resulting simple and efficient manufacturing processes disclosed in this invention provide high quality, high resolution multi-color displays with significantly lower processing costs, less defects, higher yields, and no crosstalk among neighboring color fluids. These multi-step processes may also be carried out efficiently under roll-to-roll manipulation or processing as known in the art, and they may be carried out in batch operations, or conveyed through continuous or semi-continuous operations.

BRIEF DESCRIPTION OF DRAWINGS

FIG. 1A illustrates the microcups formed from various compositions of thermoplastic or thermoset precursor (1) on a conductor film (2) and substrate (3).

FIG. 1B illustrates the microcup array filled with a removable filler material (4) with a coating comprising a layer of positive photoresists (5).

FIG. 1C illustrates the result of the first imagewise exposure of the positive photoresist by radiation, selective development and removal of the coating, and removal of the filler producing the developed and cleaned microcups.

FIG. 1D illustrates the result of the first filling and sealing of the opened microcups with a first color display fluid (6).

FIG. 1E illustrates the result of the second imagewise exposure of the positive photoresist by radiation, selective development and removal of the coating, and the removal of the filler producing the developed and cleaned microcups.

FIG. 1F illustrates the result of the second filling and sealing of the opened microcups with a second color display fluid (7).

FIG. 1G illustrates the third imagewise exposure of the positive photoresist by radiation, selective development and removal of the coating, and, the removal of the filler producing the developed and cleaned microcups.

FIG. 1H illustrates the result of the third filling and sealing of the opened microcups with a third color display fluid (8).

DETAILED DESCRIPTION OF THE INVENTION

Figure 1A:
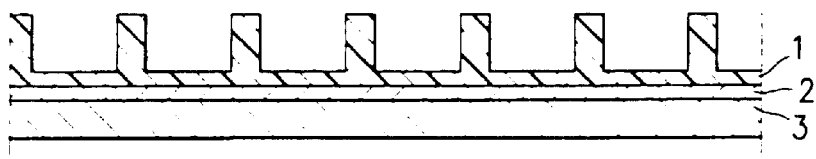
FIGS. 1A–1H illustrate various features of the invention of the process for the imagewise opening and filling of multi color display components and the manufacture of the display.
Figure 1B:
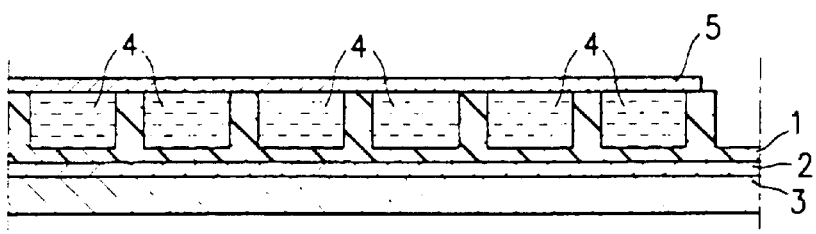
Figure 1C:
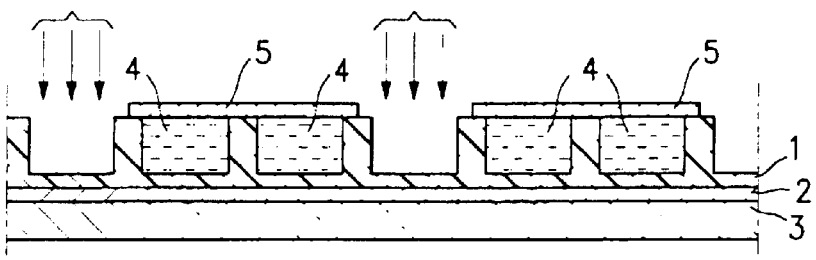
Figure 1D:
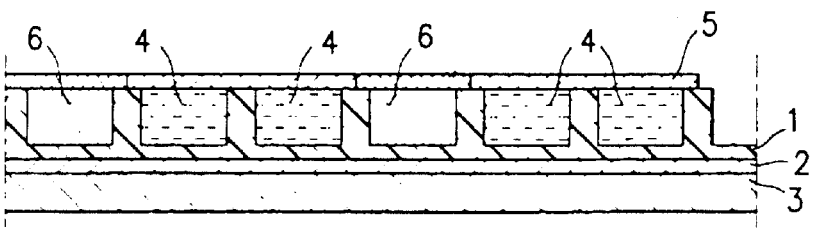
Figure 1E:
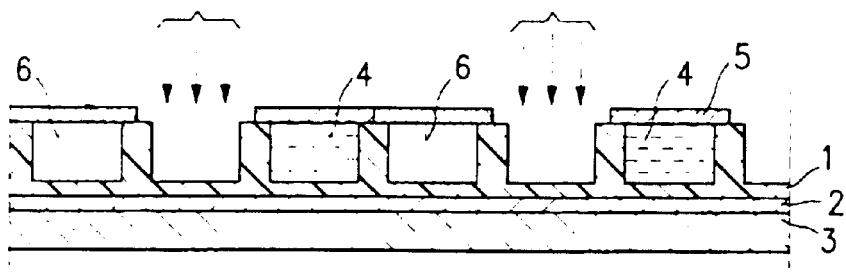
Figure 1F:
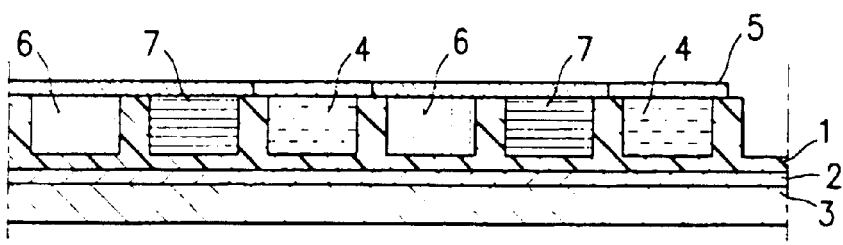
Figure 1G:
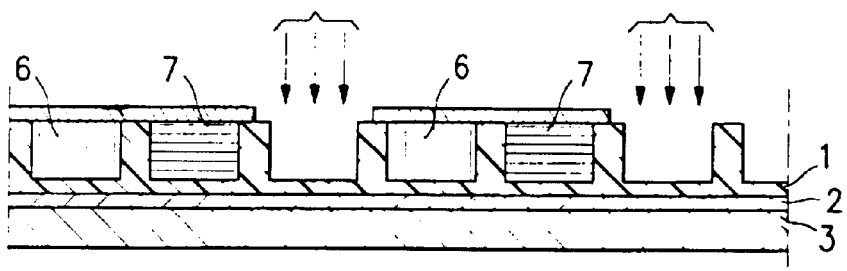
Figure 1H:
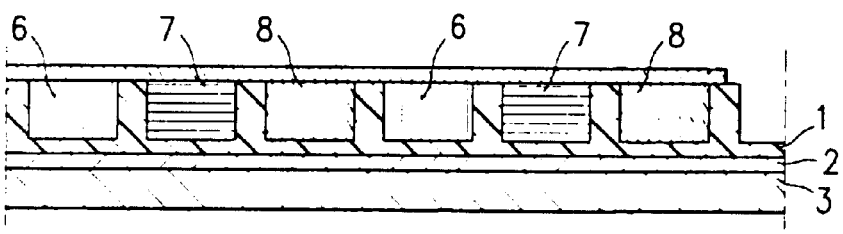

In the first aspect of this invention, microcups formed on a conductor substrate such as ITO/PET film, are filled with a removable temporary filler material. Microcups used for this invention may be circular, symmetrical or asymmetrical polygonal shapes with an opening area ranging from about 4 microns$^2$ to about 5×10$^5$ microns$_2$, preferably from about 10$_3$ microns$^2$ to about 5×10$^4$ microns$^2$. The depth may be in the range of about 5 to about 100 microns, preferably from about 10 to about 50 microns, and preferably a depth to width ratio in the range of about 0.01 to 5, most preferably from about 0.1 to 2.5.

The microcups may be arranged in many different geometric and non-geometric patterns, such as circles, polygonal such as squares, rectangular, diamond, triangular or combination thereof, for example, or they may be arranged in 2 or 3 dimensional, symmetrical or asymmetric distributions such as a plurality of rows, columns or various combinations thereof to optimize the desired visual image of the displays.

The microcups may be prepared from various compositions of thermoplastic or thermoset precursor as described in co-pending '488 and '972 Applications assigned to the same inventive entity. The precursors may comprise multifunctional or polyvalent acrylates or methacrylates, cyanoacrylates, polyvalent vinyls including divinylbenzene, divinylsilane, polyvalent vinylethers, polyvalent epoxides, polyvalent allyls, and oligomers or polymers containing the above-mentioned crosslinkable functional groups and the like. Most preferably, the thermoplastic or thermoset precursor composition comprises multifunctional acrylates and their oligomers. A crosslinkable oligomer imparting flexibility, such as urethane acrylates, polybutadiene (and its copolymers), diacrylate, or polyester acrylates, is usually added to improve the flexure resistance of the embossed microcups. The composition of the microcups may contain oligomers, monomers, additives and optionally a polymer. More than one crosslinking mechanisms may be employed. Examples include the use of hybrid of radical and cationic or ring opening polymerization mechanisms.

U.S. Patent Application '488, assigned to the same inventive entity, describes EPDs comprising cells of well-defined shape, size, pattern, and aspect ratio, and the cells are filled with charged pigment particles dispersed in an optically contrasting dielectric solvent. In addition, their methods of manufacture have also been described in the same Patent Application and is incorporated by reference herein in its entirety.

In the present invention, the microcup array was first filled with a removable temporary filler material, then coated with a layer of positive photoresist. Suitable fillers for application in this invention, include materials which do not react with or adversely affect the integrity of the microcups or the unexposed photoresist and can be readily removed during or after the development of the photoresist.

Suitable fillers used in the present invention may include materials that may be readily removed or washed out of the microcups using a cleaning solution such as acidic or basic solutions (such as developers for positive photoresist), aqueous or non-aqueous solvents or solvent mixtures that do not adversely affect or react with the microcups or the positive photoresist. Suitable materials for use as a filler include inorganic, organic, organometallic, and polymeric materials, or their particulates. The filler should be soluble or dispersible in the cleaning solution.

Nonexclusive examples of filler materials may also include water-dispersible or soluble polymers such as AQ branched polyesters (Eastman Chemical Company), Carboset® Polymers (BF Goodrich), polyvinylpyrrolidone, poly(vinyl alcohol), poly(4-vinyl phenol), novolac resin, and their copolymers. More preferable filler materials are non-film forming particles such as latexes of PMMA, polystyrene, polyethylene and their carboxylated copolymers and their corresponding salts, wax emulsions, colloidal silica, titanium oxide, and calcium carbonate dispersions, and mixtures thereof. Particularly preferable filler materials include aqueous dispersions of ionomers of ethylene copolymers such as ACqua220, ACqua240, and ACqua250 (Honeywell, N.J.). ACqua220 and 250 can be removed with conventional alkaline cleaners including the developer used for typical novolac positive photoresists. ACqua240 can be removed with hot or cold water. The dispersability or solubility of the fillers particularly the particulate fillers, may be enhanced by the use of additives such as surfactants, dispersing agents, KOH, triethanolamine, aromatic or aliphatic bases, aromatic or aliphatic acids, pre-exposed positive novolac photoresists, and water soluble polymers such as polyethylene glycol, polyvinyl alcohol, polyvinylpyrrolidone, polyvinylpyridine, polyacrylic acid, polymethacrylic acid, polyacrylamide, and their copolymers.

It has been found that the use of positive photoresist as a filler is particularly useful in applications for the selective opening, filling and sealing of relatively shallow microcups. If the microcup is totally filled with unexposed positive photoresist, the preferred microcup depth is less than 10 microns, and more preferred, less than 5 microns. For deeper microcups, a positive photoresist can be under-coated into the microcup, exposed and then over-coated with a layer of positive photoresist.

In the second aspect of this invention, the microcups containing the fillers are over-coated with a positive photoresist by using Myrad bar, gravure, doctor blade, slot coating or slit coating, or similar devices. A variety of commercially available positive photoresists are suitable for this invention. Examples include novolac based photoresists such as S-1818, SJR-1075, SJR-3000, SJR-5440, SJR-5740, APEX®-E DUV (Shipley Company), AZ-9260, AZ-4620, AZ-4562 (AZ Electronic Materials, Clariant AG), and THB-Positive (JSR Microelectronics). In the case that the positively working resist itself is also the filler, resists used for thick coating applications such as SJR-5440, SJR-5740 and those containing the t-BOC component are preferred.

In over-coating of the microcups, an excess of photoresist is usually applied in a sufficient amount to ensure that the microcups are fully covered by the resist. Preferably, application of the photoresist over the filled microcups is made such that the thickness of the resist layer above the top surface of the microcups is controlled to a range of about 0.1 to 5 microns, more preferably from about 0.5 to 3 microns. Precision coating of the resist may be performed using known procedures and devices such as a Myrad bar, gravure, doctor blade, slot coating or slit coating, or related devices. Excess resist over the microcups may be removed using a number of methods known in the art, including scraping with a wiper blade or similar devices. The photoresist is then baked in the oven by using standard procedures as suggested by photoresist suppliers. Subsequent imagewise exposure of the photoresist may be performed using a UV light source such as Loctite Zeta 7410 exposure unit equipped with a metal halide lamp with an intensity of about 6 mW/cm$^2$ at 365 nm, or ORIEL 87000 Series UV System equipped with 500 watts Model 68810 Mercury ARC Lamp with an intensity of about 5 mW/cm$^2$ at 365 nm. Exposure is performed for a period of time sufficient to show image discrimination with good contrast after the photoresist is developed by a developer.

In the third aspect of the present invention, a synchronized exposure mechanism is employed, as described in the co-pending '972 Application assigned to the same entity. In effect, the photomask loop is "rolled" in a synchronized motion relative to the web, so as to maintain alignment and registration between the mask and the web during exposure. In a continuous synchronized motion and exposure process, the web and mask are moved at the same speed in the same direction during exposure in order to maintain this constant alignment and registration. Imagewise exposure of the photoresist on selected discrete microcups can be achieved precisely and continuously on the web.

In the fourth aspect of the present invention, the exposed positive photoresist on selected microcups is developed and removed using a developer such as Developer-351 and 453 (Shipley Company, Marlborough, Mass.). The uncovered microcups may then be thoroughly washed with distilled water or a dilute developer solution to remove the filler. Surfactants, such as Triton X-100 (Union Carbide), Aerosol OT, sodium dodecylbenzene sulfonate may be added to improve the efficiency of removal of the filler in the exposed areas. The developed and cleaned microcups are then dried by using air flow, heat, or vacuum, etc.

In the fifth aspect of the invention, the opened microcups are filled with the first color display fluid, optionally containing a thermoplastic or thermoset precursor (see below), using standard coating methods as those used to coat the photoresist and filler materials onto the microcups.

Various color display fluids and suspensions are known in the art, including liquid crystals containing dichroic dyes of various colors, and different color electrophoretic fluids as described in co-pending patent applications Nos. '488 and '972.

In the sixth aspect of the invention, the filled microcups are sealed. Sealing of the microcups can be accomplished by a variety of methods described in the co-pending patent applications Nos. '488 and '972. In one of the preferred embodiments, sealing may be accomplished by dispersing a thermoplastic or thermoset precursor in the EPD fluid. The compositions of the display fluids and the thermoplastic or thermoset precursor are selected such that the display fluid is immiscible with the precursor which has a specific gravity lower than that of the display fluids. After filling the microcups with the precursor/display fluid mixture, the precursor phase separates from the color display fluid and forms a supernatant layer which is then hardened or cured by solvent evaporation, interfacial reaction, moisture, heat or radiation. Preferably, the microcups are hardened by radiation, such as UV, although a combination of two or more methods as described above may be used to increase the throughput of the sealing step.

Alternatively, sealing of the microcups may be accomplished by overcoating the EPD fluid with a solution of thermoplastic or thermoset precursor. The sealing is accomplished by hardening the precursor by solvent evaporation, interfacial reaction, moisture, heat, radiation, or a combination of various curing mechanisms. Preferably, the overcoating solution is lighter than the display fluid and has a limited miscibility with the latter to reduce the degree of intermixing during coating. Good coating uniformity and satisfactory adhesion between the sealing layer and the microcup array can be achieved by carefully adjusting surface tension and viscosity of the overcoating solution.

The complete manufacturing steps as described above may be repeated using other selected colored display fluids in the desired configuration to fill in the selected microcups. The filled and sealed multicolor microcup array is then laminated onto a conductor film such as ITO on PET with an adhesive.

The EPDs manufactured according to the present invention may be applied to the roll-to-roll continuous, or semi-continuous manufacturing operation of thin, highly flexible, and durable multi-color displays with excellent color addressability for many different applications.

The EPD prepared according to the present invention is not sensitive to manufacturing environment, such as humidity and temperature. The resulting display is thin, flexible, durable, easy-to-handle, and format-flexible. Since the EPD prepared according to the present invention comprises microcups of favorable aspect ratio and well-defined shape and size, the bi-stable reflective display has excellent color addressability, high contrast ratio, and fast switching rate.

DEFINITIONS

"Aspect ratio" refers to the depth (or height) to width, depth to length, or depth to diameter ratio of the microcups.

The term "well defined" herein is used to describe microcups or cells, and indicates that the microcup or cell has a definite shape, size and aspect ratio which are pre-determined according to the specific parameters of the manufacturing process.

EXAMPLES

EXAMPLE 1

Microcup Formulation 35 parts by weight of Ebecryl 600 (UCB), 40 parts of SR-399 (Sartomer), 10 parts of Ebecryl 4827 (UCB), 7 parts of Ebecryl 1360 (UCB), 8 parts of HDDA (UCB), 0.05 parts of Irgacure 369 (Ciba Specialty Chemicals), and 0.01 parts of isopropyl thioxanthone (ITX, Aldrich) were mixed homogeneously and used for micro-embossing.

EXAMPLE 2

Preparation of Microcup Array

A primer solution comprising of 5 parts of Ebecryl 830, 2.6 parts of SR-399 (Sartomer), 1.8 parts of Ebecryl 1701, 1 part of PMMA (Mw=350,000, Aldrich), 0.5 parts of Irgacure 500, and 40 parts of methyl ethyl ketone (MEK) was coated onto a 2 mil 60 ohm/sq. ITO/PET film (Sheldahl Inc., Minn.) using a #3 Myrad bar, dried, and UV cured by using the Zeta 7410 (5 w/cm$^2$, Loctite) exposure unit for 15 minutes in air. The microcup formulation prepared in Example 1 was coated onto the treated ITO/PET film with a targeted thickness of about 50 $\mu$m, embossed with a Ni-Co male mold having a 60 (width) $\mu$m×60 (length) $\mu$m repetitive protrusion pattern with 10 $\mu$m wide partition lines and UV cured from the PET side for 20 seconds, removed from the mold with a 2" peeling bar at a speed of about 4–5 ft/min. Well-defined micro-cups with depth ranging from 10 to 50 $\mu$m were prepared by using male molds having corresponding protrusion heights.

EXAMPLE 3

Comparative Example: Microcup Array Laminated with Novolac Photoresist 3 gm/m$^2$ (dried) of the positively working photoresist SJR-5740 (Shipley, Mass.) was coated on a removable clear support PET-4851 (Saint-Gobain, Mass.) with a Myrad bar. Onto the photoresist, 3 gm/m$^2$ (dried) of an alkali-developable adhesive composition comprising of 9 parts of Nacor 72–8685 (50% solid, National Starch) and 91 parts of 20% aqueous solution of Carboset 515 (BF Goodrich) was then coated with a Myrad bar. The three layer adhesive/resist/support was then laminated at 40° C. onto a 10 microns deep, empty microcup array prepared according to Example 2. The PET support was removed, and the photoresist laminated microcup array was imagewise exposed through a photomask using the Zeta 7410 (5 w/cm², Loctite) exposure unit for about 1 minutes and then developed by Developer-453 (Shipley) for 2 minutes. Deterioration of resist integrity in the non-exposed regions such as pin holes and delamination of resist from the microcups was observed after the development step.

EXAMPLE 4
10 Micron Deep Microcups Fully Filled with Photoresist

A 10 micron deep microcup array prepared according to Example 2 was corona treated with the BD-10A corona surface treater (Electron-Technic Products, Inc, Chicago, Ill.) for about 1 minute, then coated with photoresist SJR-5740 (42.5% solid) by using a #8 Myrad bar. The resist thickness above the top surface of the cups was measured to be about 3 microns. The coated micro-cup array was imagewise UV exposed using the Zeta 7410 exposure unit for about 1 minute and then developed by Developer-453 (Shipley) for 2 minutes. Good image discrimination with no deterioration of resist integrity on the partition wall in the non-exposed regions was observed. The exposure-development cycle was repeated once. No deterioration of resist integrity on the partition wall in the non-exposed regions was observed after the second development process.

EXAMPLE 5
Comparative Example, 40 Micron Deep Microcups Fully Filled with Photoresist The same procedure was performed as in Example 4, except that a 40 micron deep microcup array was used and the exposure time and development time were increased to 2 minutes and 13 minutes, respectively. Some defects and undesirable development of the resist on the partition wall in the non-exposed area were observed after the second development process.

EXAMPLE 6
Microcups Filled with Particulate Filler and Over-Coated with Photoresist A 35 micron depth microcup array prepared according to Example 2 was used. A filler composition containing 1 part of 10% aqueous solution of PVA 205 (Air Product) and 9 parts of a polystyrene latex (50% solid) was coated onto the microcups using a Universal Blade preset at a 25 microns gap opening. The microcup array was dried and an optical microscope examination was performed to confirm slightly under-filled microcups. The filled microcup array was over-coated with the positive photoresist SJR-5740 by using a Universal Blade preset at a 10 microns gap opening. The targeted thickness of the resist above the photoresist was 3 microns. After imagewise exposure for 30 second, the microcup array was developed with Developer-453 for 1 minute followed by a thorough rinse with de-ionized water. The exposure-development-washing cycle was repeated once. No deterioration of resist integrity on the partition wall in the non-exposed regions was observed after the second cycle.

EXAMPLE 7
Microcups Filled with Particulate Filler and Coated with Photoresist The same procedure was performed as in Example 6, except the polystyrene latex was replaced by ACqua220, ACqua240, and ACqua250 (Honeywell, N.J.) in three separate experiments. Excellent image discrimination without defect in the non-exposed regions was observed after the second cycle.

EXAMPLE 8–13
Fillers Containing Photosensitive Solubility Inhibitor

The same procedure was performed as in Example 6, except the filler was replaced by the composition shown in Table 1. Thus, 0–20% of a photoactive compound, 4-t-butylphenol 215 ester (St-Jean Photochemical) and 0–10% of polyvinylphenol (Aldrich, Mn=8000 or Mn=20,000) were added to the water dispersible resin AQ-1350 (Eastman Chemical) in MEK and coated onto microcups. The slightly under-filled microcups were blanket exposed for 2 minutes then overcoated with the photoresist SJR-5740 by using a Universal Blade preset at a 7 micron gap opening. The resist overcoated microcup array was imagewise exposed for 30 seconds and developed by the Developer-453 for 2 minutes. The exposure-development cycle was repeated once. No deterioration of resist integrity on the partition wall in the non-exposed regions was observed after the second cycle.

TABLE 1

Fillers containing exposed photosensitive solubility inhibitor (parts by weight)

| Example No. | AQ-1350 | PAC | PVPL-8,000 | PVPL-20,000 |
|---|---|---|---|---|
| 8 | 100 | 0 | | |
| 9 | 100 | 10 | | |
| 10 | 100 | 10 | 10 | |
| 11 | 100 | 10 | | 10 |
| 12 | 100 | 20 | | |
| 13 | 100 | 20 | 10 | |

PAC = 4-t-Butylphenol 215-ester;
PVPL = Poly(4-vinyl phenol).

EXAMPLE 14
Exposed Novolac Photoresist as the Filler

The same procedure was performed as in Examples 8–13, except the filler was replaced by the photoresist SJR-5740. The exposure-development cycle was repeated once. No deterioration of resist integrity on the partition wall in the non-exposed regions was observed after the second cycle.

EXAMPLE 15
TiO₂ Dispersion 6.42 Grams of Ti Pure R706 (Du Pont) were dispersed with a homogenizer into a solution containing 1.94 grams of Fluorolink D (Ausimont), 0.22 grams of Fluorolink 7004 (Ausimont), 0.37 grams of a fluorinated copper phthalocyanine dye (3M), and 52.54 grams of perfluoro solvent HT-200 (Ausimont).

EXAMPLE 16
TiO₂ Dispersion

The same procedure was performed as in Example 15, except the Ti Pure R706 and Fluorolink were replaced by a polymer coated TiO₂ particles PC-9003 (Elimentis, Highstown, N.J.) and Krytox (Du Pont), respectively.

EXAMPLE 17
Microcup Sealing

A microcup array of 35 microns depth prepared in Example 2 was used. 85 parts of the TiO₂ dispersion prepared in Example 15 were diluted with 15 parts of a perfluoro solvent FC-77 (3M) and coated onto microcups by using a Universal Blade Applicator with a 0.1 mil gap opening. A slightly underfilled microcup array was obtained. A 7.5% solution of polyisoprene in heptane was then overcoated onto the partially filled cups by a Universal Blade Applicator with a 6 mil opening. The overcoated microcups were then dried at room temperature. A seamless sealing layer of about 6 microns thickness was observed under microscope. No entrapped air bubbles were observed in the sealed microcups.

EXAMPLE 18

Microcup Sealing

The same procedure was performed as in Example 17, except-the TiO$_2$ dispersion prepared in Example 16 was used. A seamless sealing layer of about 6 microns thickness was observed under microscope. No entrapped air bubbles were observed in the sealed microcups.

While particular forms of the invention have been illustrated and described, it will be apparent that various modifications can be made without departing from the spirit and scope of the invention. Accordingly, it is not intended that the invention be limited, except as by the appended claims.

What is claimed:

1. A process for the manufacture of multicolor electrophoretic displays, which process comprises the steps of:
   a) filling display cells with a filler material;
   b) selectively opening filled cells and removing the filler material from the opened cells;
   c) filling said opened cells with a first color display fluid;
   d) sealing only said display fluid-filled cells; and
   e) repeating the above a) through d) processing steps sequentially with one or more different color display fluids until the multicolor display is formed.

2. The process of claim 1 wherein step (c) is carried out by screen printing, gravure printing or inkjet printing.

3. The process of claim 2 wherein step (c) is carried out by inkjet printing.

4. The process of claim 1 wherein step (b) is carried out by coating said filled cells with a layer of photoresist, followed by imagewise exposing and developing the exposed photoresist.

5. The process of claim 4 wherein said photoresist comprises a layer with a thickness in the range of about 0.5 to 15 microns.

6. The process of claim 5 wherein said photoresist comprises a layer with a thickness in the range of about 1 to 3 microns.

7. The process of claim 4 wherein said photoresist is a polyvinylphenol-based photoresist.

8. The process of claim 4 wherein said photoresist is a t-BOC derivative of a polyvinylphenol-based photoresist.

9. The process of claim 4 wherein said exposing step is performed by UV radiation, visible light or other radiation sources.

10. The process of claim 9 further comprising the step of soft baking the photoresist before said exposing step.

11. The process of claim 4 wherein said developing step comprises contacting said exposed cells with a developing solution.

12. The process of claim 11 wherein said developing solution is a base developer selected from the group consisting of alkaline solutions, Developer-351 and Developer-453.

13. The process of claim 11 wherein said developing solution contains an additive.

14. The process of claim 13 wherein said additive is a surfactant or dispersing agent.

15. The process of claim 4 wherein the developing step further comprising the step of washing the developed cells with a solvent or a mixture of solvents.

16. The process of claim 15 wherein the solvent is distilled water or deionized water.

17. The process of claim 1 wherein said filler material is capable of being readily removed from the cells by using a cleaning solution which is a weak solvent or non-solvent for a non-exposed photoresist, but is a good solvent or dispersion medium for the filler material.

18. The process of claim 17 wherein said cleaning solution is an aqueous solution.

19. The process of claim 1 wherein said filler material is selected from the group consisting of organic, inorganic, and polymer particulates, water soluble and dispersible polymers and mixtures thereof.

20. The process of claim 19 wherein said filler material is selected from the group consisting of AQ branched polyesters, Carboset® Polymers, poly(vinyl alcohol), polyvinylpyrrolidone, poly(4-vinyl phenol), pre-exposed positive photoresists, polyacrylic acid, polymethacrylic acid, and their copolymers, ACqua220, ACqua240, and ACqua250 dispersions, non-film forming latexes, colloidal silica and mixtures thereof.

21. The process of claim 20 wherein said non-film forming latexes is PMMA or polystyrene latexes.

22. The process of claim 1 wherein said filler material contains additives selected from the group consisting of surfactants, dispersing agents and photosensitive dissolution-inhibiting compounds.

23. The process of claim 22 wherein said photosensitive dissolution-inhibiting compound is a diazide compound.

24. The process of claim 1 wherein said filler material is pre-exposed positive working novolac photoresist.

25. The process of claim 24 wherein said photoresist is selected from the group consisting of the novolac-based photoresist S-1818, SJR-1075, SJR-3000, SJR-5440, SJR-5740, AZ-9260, AZ-4620, AZ-4562, THB-Positive and mixtures thereof.

26. The process of claim 1 wherein said display fluid is an electrophoretic fluid comprising a dispersion of particles in a colored dielectric solvent.

27. The process of claim 26 wherein said particles are white particles.

28. The process of claim 1 wherein said display fluid is liquid crystals.

29. The process of claim 28 wherein said liquid crystals comprise a dichroic dye.

30. The process of claim 1 wherein said display fluid colors are red, blue and green in no particular order.

31. The process of claim 1 wherein said sealing step of filled cells comprises the step of applying a layer of thermoplastic or thermoset precursor and hardening said layer.

32. The process according to claim 31 wherein said sealing of the filled cells is accomplished by overcoating said display fluid with a thermoplastic or thermoset precursor composition which is partially immiscible with said display fluid, said precursor composition having specific gravity lower than that of said display fluid, followed by hardening of said thermoplastic or thermoset precursor composition.

33. The process of claim 31 wherein said hardening of said thermoplastic or thermoset layer is accomplished by evaporation of a solvent or plasticizer, by cooling, interfacial reaction, moisture, heat, radiation or a combination of the above-mentioned methods.

34. The process of claim 1 further comprising the step of applying one or more additional layers of thermoplastic or thermoset precursor and sealing the filled multicolor display by curing or hardening.

35. The process of claim 1 wherein the steps are performed in a roll-to-roll processing technology, conveyed in continuous or semi-continuous operation.

36. A multicolor electrophoretic display manufactured according to the process of claim 1 wherein the optically active viewing fraction of surface area of said display is greater than about 40%.

37. The multicolor electrophoretic display of claim 36 comprising cells having an opening area ranging from about 4 to about $5 \times 10^5$ $\mu m^2$.

38. The multicolor electrophoretic display of claim 36 comprising cells having an opening area from about $10^3$ to about $5 \times 10^4$ $\mu m^2$.

39. The multicolor electrophoretic display of claim 36 comprising cells having an opening with a circular, polygonal, hexagonal, rectangular, square shape or combination of shapes thereof.

40. The multicolor electrophoretic display of claim 36 comprising cells having a depth in the range from about 5 to about 100 microns.

41. The multicolor electrophoretic display of claim 36 comprising cells having a depth in the range preferably from about 10 to about 50 microns.

42. The multicolor electrophoretic display of claim 36 comprising cells having an aspect ratio in the range of about 0.01 to about 5.

43. The multicolor electrophoretic display of claim 36 comprising cells having an aspect ratio from about 0.1 to about 2.5.

44. A process for the manufacture of multicolor electrophoretic display, which process comprises:
   a) filling display cells with a filler material;
   b) removing the filler material in display cells prior to filling with a display fluid; and
   c) sealing only said display cells filled with said display fluid.

45. The process of claim 44 wherein said filler material is removed from selected display cells.

46. The process of claim 44 wherein said filler material is selected from the group consisting of organic, inorganic, and polymer particulates, water soluble and dispersible polymers and mixtures thereof.

47. The process of claim 46 wherein said filler material is selected from the group consisting of AQ branched polyesters, Carboset® Polymers, poly(vinyl alcohol), polyvinylpyrrolidone, poly(4-vinyl phenol), pre-exposed positive photoresists, polyacrylic acid, polymethacrylic aid, and their copolymers, ACqua220, ACqua240, and ACqua250 dispersions, non-film forming latexes, colloidal silica and mixtures thereof.

48. The process of claim 47 wherein said non-film forming latexes is PMMA or polystyrene latexes.

\* \* \* \* \*

UNITED STATES PATENT AND TRADEMARK OFFICE
CERTIFICATE OF CORRECTION

| | |
|---|---|
| PATENT NO. | : 6,972,893 B2 |
| APPLICATION NO. | : 10/284586 |
| DATED | : December 6, 2005 |
| INVENTOR(S) | : Xianhai Chen et al. |

It is certified that error appears in the above-identified patent and that said Letters Patent is hereby corrected as shown below:

On the Title page, in Related U.S. Application Data Item (63), line 1: delete "Continuation", and insert --Continuation-in-part--.

Column 1, line 8: delete "continuation", and insert --continuation-in-part--.

Column 5, line 60: delete "AQ", and insert --AQ®--.

Column 5, line 61: before "Eastman Chemical Company", insert --water-dispersible branched sulfopolyesters,--.

Column 5, lines 61-62: delete "Carboset®" and insert --CARBOSET® (carboxylated acrylic-based)--.

Column 6, line 4: delete "ACqua220, ACqua240, and ACqua250" and insert --ACQUA220® (zinc ionomer of ethylene copolymer), ACQUA240® (sodium ionomer dispersion of ethylene acrylic acid copolymer), and ACQUA250® (N,N-diethylethanolamine)--.

Column 6, line 5: delete "Acqua220 and 250" and insert --ACQUA220® and ACQUA250®--.

Column 6, line 7: delete "ACqua240" and insert --ACQUA240®--.

Column 7, line 11: delete "Developer-351 and 453", and insert --DEVELOPER 351® (sodium hydroxide, sodium tetraborate decahydrate and borate solution) and DEVELOPER 453® (potassium hydroxide and borate solution)--.

Column 7, line 23: after "microcups." insert --Alternatively, the filing may be accomplished by methods such as screen printing, gravure printing, inkfet printing or the like.--.

Signed and Sealed this

Thirtieth Day of March, 2010

David J. Kappos
*Director of the United States Patent and Trademark Office*